US008433347B2

(12) United States Patent
Cao

(10) Patent No.: US 8,433,347 B2
(45) Date of Patent: Apr. 30, 2013

(54) METHOD AND APPARATUS FOR VERIFYING NETWORK MANAGEMENT SHORT MESSAGE OF WIRELESS PUBLIC PHONE

(75) Inventor: Liqiang Cao, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 0 days.

(21) Appl. No.: 13/258,075

(22) PCT Filed: Oct. 19, 2010

(86) PCT No.: PCT/CN2010/077856
§ 371 (c)(1),
(2), (4) Date: Nov. 30, 2011

(87) PCT Pub. No.: WO2011/153773
PCT Pub. Date: Dec. 15, 2011

(65) Prior Publication Data
US 2013/0072238 A1 Mar. 21, 2013

(30) Foreign Application Priority Data
Jun. 9, 2010 (CN) .......................... 2010 1 0196146

(51) Int. Cl.
H04Q 7/20 (2006.01)
(52) U.S. Cl.
USPC .................. 455/466; 455/412.1; 455/418
(58) Field of Classification Search .............. 455/466, 455/418, 412.1
See application file for complete search history.

(56) References Cited

U.S. PATENT DOCUMENTS

| 6,807,411 | B1 * | 10/2004 | De Kermadec | 455/412.1 |
| 6,952,171 | B2 * | 10/2005 | Puccioni | 340/932.2 |
| 7,715,824 | B2 * | 5/2010 | Zhou | 455/412.1 |
| 2006/0019684 | A1 * | 1/2006 | Yu et al. | 455/466 |
| 2006/0105752 | A1 * | 5/2006 | Jeong | 455/414.1 |
| 2007/0153733 | A1 * | 7/2007 | Kim et al. | 370/329 |
| 2007/0197236 | A1 * | 8/2007 | Ahn et al. | 455/466 |
| 2010/0112993 | A1 | 5/2010 | Peng | |
| 2011/0288868 | A1 * | 11/2011 | Lloyd et al. | 704/251 |

FOREIGN PATENT DOCUMENTS

CN 1878349 A 12/2006

OTHER PUBLICATIONS

International Search Report for PCT/CN2010/077856 dated Mar. 7, 2011.

* cited by examiner

Primary Examiner — Danh Le
(74) Attorney, Agent, or Firm — Ling Wu; Stephen Yang; Ling and Yang Intellectual Property

(57) ABSTRACT

The present invention relates to a method and apparatus for verifying a network management short message of a wireless public phone. The method comprises: receiving a network management short message containing a sending party number, a sending party short message center number and a short message content; comparing the sending party number with a pre-stored number; when the sending party number is consistent with the pre-stored number, comparing the sending party short message center number with a pre-stored short message center number; when the sending party short message center number is consistent with the pre-stored short message center number, comparing the short message content in the network management short message with a pre-stored short message content; and when the short message content in the network management short message is consistent with the pre-stored short message content, confirming that the verification of the network management short message succeeds.

16 Claims, 2 Drawing Sheets

METHOD AND APPARATUS FOR VERIFYING NETWORK MANAGEMENT SHORT MESSAGE OF WIRELESS PUBLIC PHONE

TECHNICAL FIELD

The present invention relates to the communication field, and more particularly, to a method and apparatus for verifying a network management short message of a wireless public phone.

BACKGROUND OF THE RELATED ART

With the rapid development of the communication technique, the wired communication has occupied an important position in people's life. However, a great deal of communication demands always exist in some places with more special geographical environments, but the fixed network is unable to cover these places or line laying of the fixed network is inconvenience. Therefore, a wireless public phone terminal (wireless access fixed station) which can replace a fixed network public phone is generated. Since the wireless public phone has features of simple coverage and low cost, and can also implement charging function, it has advantages which are unable to be replaced by traditional fixed network public phones.

An Operator modify the charging rate of wireless public phones according to market situations, and remotely send it to all the wireless public phone terminals through a network management short message. The wireless public phone terminal verifies the received network management short message to match a special short message format and a sending number, and modifies the charging rate after the matching is successful.

However, any Short Message Center (SMC) can disguise itself as any sending number to send short messages. Thus, once the special short message format and the sending party number are leaked out, other operators can use their own SMCs to send network management short messages to arbitrarily adjust the charging rate information of the wireless public phone of this operator, thus severely affecting the benefits of the operator.

SUMMARY OF THE INVENTION

A main object of the present invention is to provide a method and apparatus for verifying a network management short message of a wireless public phone so as to improve the reliability of verifying the network management short message.

The present invention provides a method for verifying a network management short message of a wireless public phone comprising the following steps of:

receiving a network management short message containing a sending party number, a sending party short message center number and a short message content;

comparing the sending party number with a pre-stored number;

when the sending party number is consistent with the pre-stored number, comparing the sending party short message center number with a pre-stored short message center number;

when the sending party short message center number is consistent with the pre-stored short message center number, comparing the short message content in the network management short message with a pre-stored short message content; and when the short message content in the network management short message is consistent with the pre-stored short message content, confirming that the verification of the network management short message succeeds.

Preferably, when the sending party number is inconsistent with the pre-stored number, the network management short message is processed as a common short message.

Preferably, when the sending party short message center number is inconsistent with the pre-stored short message center number, the network management short message is discarded.

Preferably, when the short message content in the network management short message is inconsistent with the pre-stored short message content, the network management short message is processed as a common short message.

Preferably, after the step of confirming that the verification of the network management short message succeeds, the method further comprises:

updating charging rate information based on the short message content in the network management short message.

The present invention provides an apparatus for verifying a network management short message of a wireless public phone comprising:

an obtaining unit configured to receive a network management short message containing a sending party number, a sending party short message center number and a short message content;

a first comparison unit configured to compare the sending party number with a pre-stored number;

a second comparison unit configured to compare the sending party short message center number with a pre-stored short message center number when the sending party number is consistent with the pre-stored number;

a third comparison unit configured to compare the short message content in the network management short message with a pre-stored short message content when the sending party short message center number is consistent with the pre-stored short message center number; and a processing unit configured to confirm that the verification of the network management short message succeeds when the short message content in the network management short message is consistent with the pre-stored short message content.

Preferably, the processing unit is further configured to process the network management short message as a common short message when the sending party number is inconsistent with the pre-stored number.

Preferably, the processing unit is further configured to discard the network management short message when the sending party short message center number is inconsistent with the pre-stored short message center number.

Preferably, the processing unit is further configured to process the network management short message as a common short message when the short message content in the network management short message is inconsistent with the pre-stored short message content.

Preferably, the apparatus further comprises:

an update unit configured to update charging rate information based on the short message content in the network management short message when the short message content in the network management short message is consistent with the pre-stored short message content.

The method and apparatus for verifying a network management short message of the wireless public phone in accordance with the present invention compare the sending party number, the short message center number and the short message content in the network management short message respectively, and confirm that the verification of the network management short message succeeds only when all of the comparisons are consistent such that unlawful persons can be prevented from sending the network management short message through their own short message centers to adjust the charging rate of the wireless public phone, further improving the reliability of verifying the network management short message.

The implementation of the objects, function features and advantages of the present invention will be further described with reference to the accompanying drawings.

PREFERRED EMBODIMENTS OF THE PRESENT INVENTION

It should be understood that the particular embodiment described herein is only intended to explain the present invention, and not to limit the present invention.

A pre-stored number, pre-stored short message center number and pre-stored short message content for identifying a network management short message are written into a wireless public phone terminal in advance. The pre-stored number and pre-stored short message center number can be obtained from an operator. The wireless public phone terminal verifies the network management short message based on the pre-stored number, pre-stored short message center number and pre-stored short message content after receiving the network management short message such that the wireless public phone terminal can verify the network management short message more reliably and securely.

Figure 1:
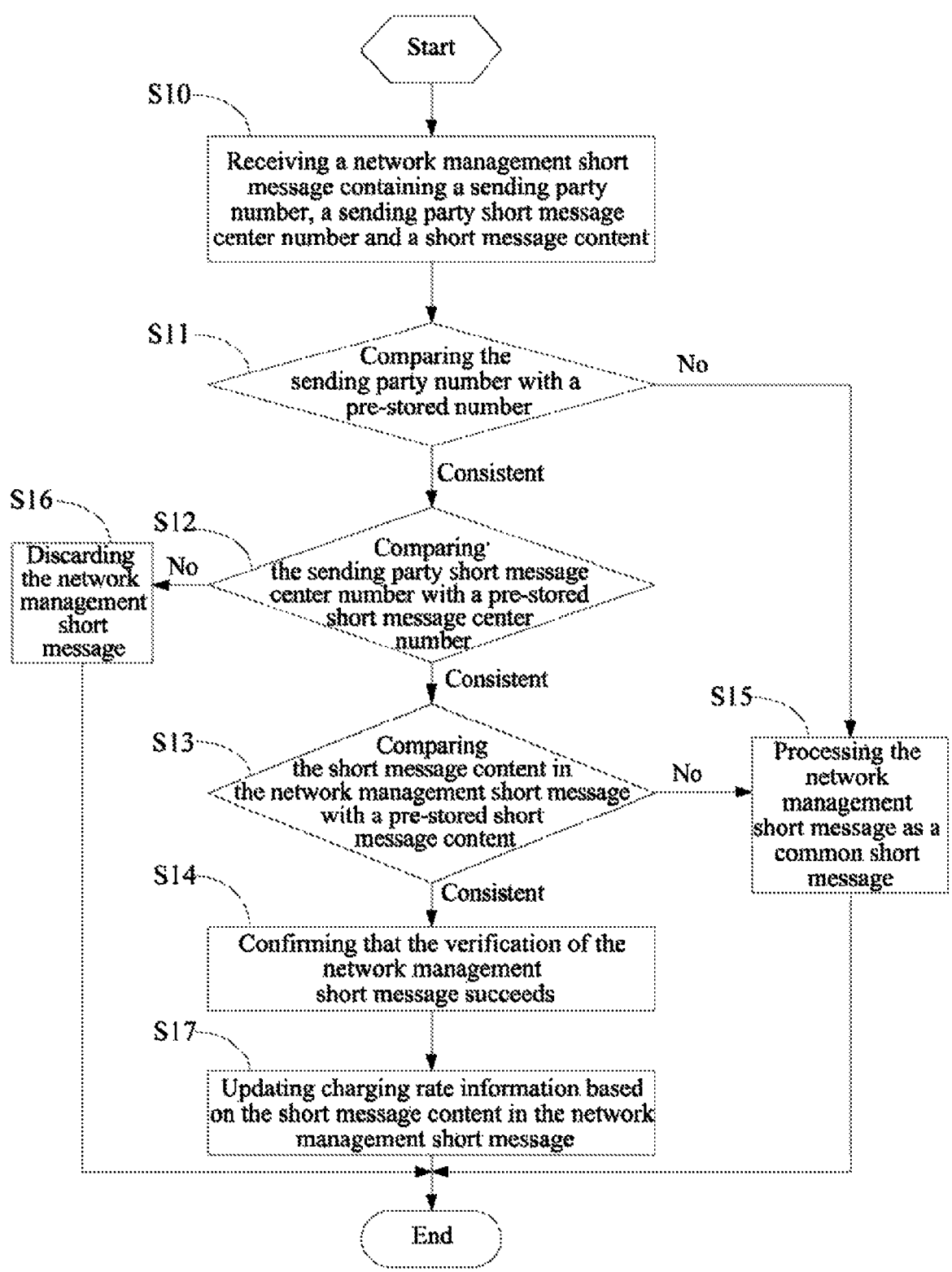
FIG. 1 is a flow chart of a method for verifying a network management short message of a wireless public phone according to one embodiment of the present invention.

FIG. 1 is a flow chart of a method for verifying a network management short message of a wireless public phone according to one embodiment of the present invention The method for verifying the network management short message of the wireless public phone according to this embodiment comprises the following steps.

Step S10, the network management short message containing a sending party number, a sending party short message center number and a short message content is received.

Step S11, the sending party number is compared with a pre-stored number; when the sending party number is consistent with the pre-stored number, step S12 is performed; and when the sending party number is inconsistent with the pre-stored number, step S15 is performed.

Step S12, the sending party short message center number is compared with a pre-stored short message center number; when the sending party short message center number is consistent with the pre-stored short message center number, step S13 is performed; and when the sending party short message center number is inconsistent with the pre-stored short message center number, step S16 is performed.

Step S13, the short message content of this network management short message is compared with the pre-stored short message content; when the short message content of the network management short message is consistent with the pre-stored short message content, step S14 is performed; and when the short message content of the network management short message is inconsistent with the pre-stored short message content, step S15 is performed.

In the pre-stored short message content, a head and a tail of the short message can use a fixed format, and a medium part uses a fixed flag bit format to denote a charging rate value. The short message content of the network management short message is compared with the pre-stored short message content, and if they are consistent, then step S14 is performed, otherwise, step S15 is performed.

Step S14, it is confirmed that the verification of the network management short message succeeds.

When the sending party center number, the short message center number and the short message content of the network management short message are consistent respectively with the pre-stored number, pre-stored short message center number and pre-stored short message content for identifying the network management short message which are written into the wireless public phone terminal in advance, it is confirmed that the verification of this network management short message succeeds.

Step S15, the network management short message is processed as a common short message.

When the sending party number contained in the network management short message is consistent with the pre-stored number of the wireless public phone terminal, then the network management short message is processed as a common short message. The wireless public phone terminal receives the short message as usual, and the user can also view the short message.

When the short message content contained in the network management short message is inconsistent with the pre-stored short message content, the wireless public phone terminal also processes the network management short message as a common short message.

Step S16, the network management short message is discarded.

When the sending party short message center number contained in the network management short message is inconsistent with the pre-stored short message center number, the wireless public phone terminal discards the network management short message, which will not be displayed on the wireless public phone terminal.

The method for verifying the network management short message of the wireless public phone according to this embodiment compares the sending party number, the short message center number and the short message content in the network management short message respectively, and confirms that the verification of the network management short message succeeds only when all of the comparisons are consistent such that unlawful persons can be prevented from sending the network management short message through their own short message centers to adjust charging rate of the wireless public phone, further improving the reliability of verifying the network management short message.

After the above step S14, the method further comprises the following step.

Step S17, the charging rate information is updated based on the short message content in the network management short message.

When the wireless public phone terminal confirms that the verification of the network management short message succeeds, it enters into the flow of processing the network management short message. The wireless public phone terminal updates the charging rate information stored in the wireless public phone terminal based on the charging rate value contained in the network management short message. The charging rate information is stored in a specific storage space in the wireless public phone terminal such that the wireless public phone terminal can extract the charging rate information from the storage space whenever powered on.

Figure 2:
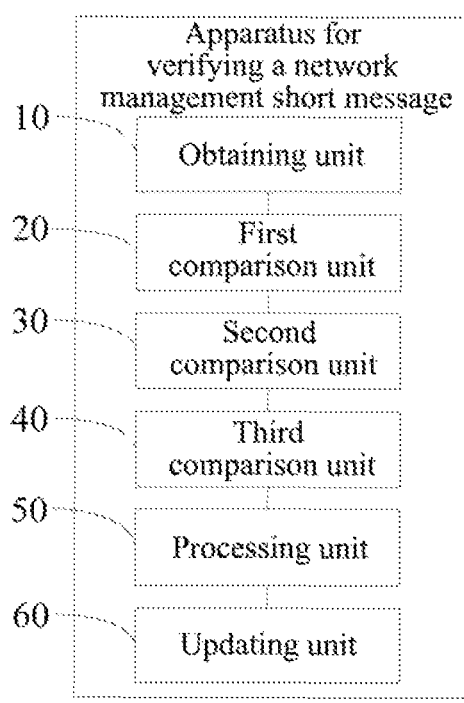
FIG. 2 is a block diagram of an apparatus one for verifying a network management short message of a wireless public phone according to one embodiment of the present invention.

FIG. 2 is a block diagram of an apparatus one for verifying a network management short message of a wireless public phone according to one embodiment of the present invention.

The apparatus for verifying the network management short message of the wireless public phone according to the example comprises an obtaining unit 10, a first comparison unit 20, a second comparison unit 30, third comparison unit 40 and a processing unit 50.

The obtaining unit 10 is configured to receive the network management short message containing a sending party number, sending party short message center number and short message content.

The first comparison unit 20 is configured to compare the sending party number with a pre-stored number.

The second comparison unit 30 is configured to compare the sending party short message center number with a pre-stored short message center number when the sending party number is consistent with the pre-stored number.

The third comparison unit 40 is configured to compare the short message content of the network management short message with the pre-stored short message content when the sending party short message center number is consistent with the pre-stored short message center number.

The processing unit 50 is configured to confirm that the verification of the network management short message succeeds when the short message content of the network management short message is consistent with the pre-stored short message content.

The processing unit 50 is further configured to process the network management short message as a common short message when the sending party number is inconsistent with the pre-stored number.

The processing unit 50 is further configured to discard the network management short message when the sending party short message center number is inconsistent with the pre-stored short message center number.

The processing unit 50 is further configured to process the network management short message as a common short message when the short message content of the network management short message is inconsistent with the pre-stored short message content.

The apparatus further comprises an update unit 60.

The update unit 60 is configured to update charging rate information based on the short message content in the network management short message when the short message content of the network management short message is consistent with the pre-stored short message content.

The apparatus for verifying a network management short message of the wireless public phone in accordance with the present invention compares the sending party number, the short message center number and the short message content in the network management short message respectively, and confirms that the verification of the network management short message succeeds only when all of the comparisons are consistent such that unlawful persons can be prevented from sending the network management short message through their own short message centers to adjust the charging rate of the wireless public phone, further improving the reliability of verifying the network management short message.

The above description is only the preferred embodiment of the present invention, and is not intended to limit the patent scope of the present invention. All variations of equivalent structures or equivalent flows made to contents of the description and the accompanying figures of the present invention or directly or indirectly applied in other related technical fields should covered in the patent protection scope of the present invention.

INDUSTRIAL APPLICABILITY

Comparing with the prior art, the present invention can prevent unlawful persons from sending the network management short message through their own short message centers to adjust the charging rate of the wireless public phone, further improving the reliability of verifying the network management short message.

What is claimed is:

1. A method for verifying a network management short message of a wireless public phone comprising the following steps of:
    receiving a network management short message containing a sending party number, a sending party short message center number and a short message content;
    comparing the sending party number with a pre-stored number;
    when the sending party number is consistent with the pre-stored number, comparing the sending party short message center number with a pre-stored short message center number;
    when the sending party short message center number is consistent with the pre-stored short message center number, comparing the short message content in the network management short message with a pre-stored short message content; and
    when the short message content in the network management short message is consistent with the pre-stored short message content, confirming that the verification of the network management short message succeeds.

2. The method according to claim 1, further comprising: when the sending party number is inconsistent with the pre-stored number, processing the network management short message as a common short message.

3. The method according to claim 2, further comprising: when the sending party short message center number is inconsistent with the pre-stored short message center number, discarding the network management short message.

4. The method according to claim 3, further comprising: when the short message content in the network management short message is inconsistent with the pre-stored short message content, processing the network management short message as a common short message.

5. The method according to claim 1, wherein after the step of confirming that the verification of the network management short message succeeds, the method further comprises:
    updating charging rate information based on the short message content in the network management short message.

6. The method according to claim 2, wherein after the step of confirming that the verification of the network management short message succeeds, the method further comprises:
    updating charging rate information based on the short message content in the network management short message.

7. The method according to claim 3, wherein after the step of confirming that the verification of the network management short message succeeds, the method further comprises:
    updating charging rate information based on the short message content in the network management short message.

8. The method according to claim 4, wherein after the step of confirming that the verification of the network management short message succeeds, the method further comprises:
    updating charging rate information based on the short message content in the network management short message.

9. An apparatus for verifying a network management short message of a wireless public phone comprising:
- an obtaining unit configured to receive a network management short message containing a sending party number, a sending party short message center number and a short message content;
- a first comparison unit configured to compare the sending party number with a pre-stored number;
- a second comparison unit configured to compare the sending party short message center number with a pre-stored short message center number when the sending party number is consistent with the pre-stored number;
- a third comparison unit configured to compare the short message content in the network management short message with a pre-stored short message content when the sending party short message center number is consistent with the pre-stored short message center number; and
- a processing unit configured to confirm that the verification of the network management short message succeeds when the short message content in the network management short message is consistent with the pre-stored short message content.

10. The apparatus according to claim 9, wherein the processing unit is further configured to process the network management short message as a common short message when the sending party number is inconsistent with the pre-stored number.

11. The apparatus according to claim 10, wherein the processing unit is further configured to discard the network management short message when the sending party short message center number is inconsistent with the pre-stored short message center number.

12. The apparatus according to claim 11, wherein the processing unit is further configured to process the network management short message as a common short message when the short message content in the network management short message is inconsistent with the pre-stored short message content.

13. The apparatus according to claim 9, further comprising:
- an update unit configured to update charging rate information based on the short message content in the network management short message when the short message content in the network management short message is consistent with the pre-stored short message content.

14. The apparatus according to claim 10, further comprising:
- an update unit configured to update charging rate information based on the short message content in the network management short message when the short message content in the network management short message is consistent with the pre-stored short message content.

15. The apparatus according to claim 11, further comprising:
- an update unit configured to update charging rate information based on the short message content in the network management short message when the short message content in the network management short message is consistent with the pre-stored short message content.

16. The apparatus according to claim 12, further comprising:
- an update unit configured to update charging rate information based on the short message content in the network management short message when the short message content in the network management short message is consistent with the pre-stored short message content.

* * * * *